(12) United States Patent
Gandhi et al.

(10) Patent No.: US 11,088,635 B2
(45) Date of Patent: Aug. 10, 2021

(54) ACTUATOR WITH SEALABLE EDGE REGION

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 447 days.

(21) Appl. No.: 16/170,959

(22) Filed: Oct. 25, 2018

(65) Prior Publication Data
US 2020/0136525 A1 Apr. 30, 2020

(51) Int. Cl.
*H02N 1/00* (2006.01)
*F15B 21/06* (2006.01)
(Continued)

(52) U.S. Cl.
CPC .................. *H02N 1/006* (2013.01)

(58) Field of Classification Search
CPC ........ H02N 1/006; H02N 1/004; H02N 1/002; H02N 1/00; F03G 7/00; F15B 21/065;
(Continued)

(56) References Cited

U.S. PATENT DOCUMENTS

| 2,241,086 A | 1/1939 | Gould |
| 4,286,910 A | 9/1981 | Conrad |

(Continued)

FOREIGN PATENT DOCUMENTS

| JP | 2007097292 A | 4/2007 |
| KR | 20050056526 A | 6/2005 |

(Continued)

OTHER PUBLICATIONS

Acome et al., "Hydraulically Amplified Self-Healing Electrostatic Actuators with Muscle-Like Performance," Science, vol. 359, Issue 6371, 61-65 (2018).

(Continued)

*Primary Examiner* — Edgardo San Martin
(74) *Attorney, Agent, or Firm* — Christopher G. Darrow; Darrow Mustafa PC (57) ABSTRACT

Actuators having reversible seals are described herein. The actuators can move from a first position to a second position and lock in the second position using a reversible seal. The device can include a soft hydraulic actuator having a fluid-impermeable membrane. The fluid-impermeable membrane can define a compartment, the compartment having a central region, an edge region extending from and fluidly connected with the central region, a reversible seal between the central region and the edge region, and a dielectric fluid. When actuated, the actuators can force fluid through the reversible seals and into the edge region. Once in the edge region, the reversible seals be actuated and controllably sealed to prevent return flow.

20 Claims, 6 Drawing Sheets

(51) Int. Cl.
  *F15B 15/08* (2006.01)
  *F15B 15/10* (2006.01)
(58) Field of Classification Search
  CPC .......... F15B 21/06; F15B 15/10; F15B 15/08; F15B 15/088; B65D 90/56; B65D 90/58; F04B 53/10; F16K 99/0011; F16K 99/0051
  See application file for complete search history.

(56) References Cited

U.S. PATENT DOCUMENTS

| | | | |
|---|---|---|---|
| 4,319,427 A | 3/1982 | Way, Jr. | |
| 4,726,656 A | 2/1988 | Schofield et al. | |
| 5,065,978 A | 11/1991 | Albarda et al. | |
| 5,222,668 A * | 6/1993 | Frankeny | H01R 12/853 439/197 |
| 5,240,677 A | 8/1993 | Jones et al. | |
| 6,120,002 A | 9/2000 | Biegelsen et al. | |
| 6,215,221 B1 | 4/2001 | Cabuz et al. | |
| 6,490,960 B1 | 12/2002 | Jackson et al. | |
| 6,685,442 B2 | 2/2004 | Chinn et al. | |
| 6,830,071 B2 * | 12/2004 | Xu | F15C 5/00 137/625.33 |
| 6,939,291 B2 | 9/2005 | Phee Soo Jay | |
| 6,994,314 B2 | 2/2006 | Garnier et al. | |
| 7,353,747 B2 | 4/2008 | Swayze et al. | |
| 7,484,735 B2 | 2/2009 | Verbrugge et al. | |
| 7,521,840 B2 | 4/2009 | Heim | |
| 7,673,562 B2 | 3/2010 | Pattekar et al. | |
| 7,834,527 B2 | 11/2010 | Alvarez Icaza Rivera et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 8,222,799 B2 | 7/2012 | Polyakov et al. | |
| 8,231,563 B2 * | 7/2012 | Mauge | A61M 27/006 604/9 |
| 8,272,392 B2 | 9/2012 | Pattekar et al. | |
| 8,430,810 B2 | 4/2013 | Hassidov et al. | |
| 8,863,608 B2 | 10/2014 | Fischer et al. | |
| 9,061,118 B2 | 6/2015 | Shoham et al. | |
| 9,764,113 B2 | 9/2017 | Tuval et al. | |
| 9,790,968 B2 | 10/2017 | Yang et al. | |
| 10,058,647 B2 | 8/2018 | Roche et al. | |
| 10,293,718 B1 | 5/2019 | Ilievski et al. | |
| 10,631,083 B1 | 4/2020 | Gandhi et al. | |
| 10,640,033 B1 | 5/2020 | Gandhi et al. | |
| 10,682,903 B1 | 6/2020 | Gandhi et al. | |
| 10,682,931 B2 | 6/2020 | Rowe et al. | |
| 10,746,206 B1 * | 8/2020 | Rowe | F15B 15/10 |
| 10,946,535 B2 * | 3/2021 | Gandhi | B25J 18/06 |
| 2002/0100888 A1 | 8/2002 | Sharma et al. | |
| 2004/0107829 A1 | 6/2004 | Davis et al. | |
| 2004/0234401 A1 | 11/2004 | Banister | |
| 2004/0261411 A1 | 12/2004 | MacGregor | |
| 2005/0045480 A1 | 3/2005 | Krumme | |
| 2005/0198904 A1 | 9/2005 | Browne et al. | |
| 2005/0206096 A1 | 9/2005 | Browne et al. | |
| 2006/0038745 A1 | 2/2006 | Naksen et al. | |
| 2007/0046074 A1 | 3/2007 | Satta et al. | |
| 2007/0120438 A1 | 5/2007 | Divoux | |
| 2007/0246898 A1 | 10/2007 | Keefe et al. | |
| 2009/0086331 A1 | 4/2009 | Gunasekaran et al. | |
| 2009/0115285 A1 | 5/2009 | Najafi et al. | |
| 2010/0254837 A1 | 10/2010 | Boersma et al. | |
| 2010/0258362 A1 | 10/2010 | Trimmer | |
| 2011/0188258 A1 | 8/2011 | Tajima | |
| 2012/0287493 A1 | 11/2012 | Kuhlman et al. | |
| 2013/0255815 A1 | 10/2013 | Brinkmann et al. | |
| 2013/0304049 A1 | 11/2013 | Behnke, II et al. | |
| 2013/0318962 A1 | 12/2013 | Joshi et al. | |
| 2015/0331156 A1 | 11/2015 | Hirsa | |
| 2016/0106620 A1 | 4/2016 | Uno et al. | |
| 2017/0150252 A1 | 5/2017 | Trestain et al. | |
| 2018/0036198 A1 | 2/2018 | Mergl et al. | |
| 2018/0172172 A1 | 6/2018 | Oehler et al. | |
| 2018/0339624 A1 | 11/2018 | Leck | |
| 2019/0023161 A1 | 1/2019 | Sullivan et al. | |
| 2019/0032684 A1 | 1/2019 | Kowalewski et al. | |
| 2019/0059608 A1 | 2/2019 | Yan et al. | |
| 2019/0232822 A1 | 8/2019 | Hintermaier | |
| 2019/0296217 A1 | 9/2019 | Jung et al. | |
| 2020/0032822 A1 | 1/2020 | Keplinger et al. | |
| 2020/0130202 A1 | 4/2020 | Gandhi et al. | |
| 2020/0130321 A1 | 4/2020 | Gandhi et al. | |
| 2020/0132213 A1 | 4/2020 | Gandhi et al. | |
| 2020/0132223 A1 | 4/2020 | Prokhorov et al. | |
| 2020/0136526 A1 | 4/2020 | Gandhi et al. | |
| 2020/0156314 A1 | 5/2020 | Rowe et al. | |
| 2020/0182269 A1 | 6/2020 | Rowe | |
| 2020/0189469 A1 | 6/2020 | Gandhi et al. | |
| 2020/0216121 A1 | 7/2020 | Gandhi et al. | |
| 2020/0238854 A1 | 7/2020 | Gandhi et al. | |
| 2020/0259426 A1 | 8/2020 | Rowe | |

FOREIGN PATENT DOCUMENTS

| | | |
|---|---|---|
| WO | 2017077541 A1 | 5/2017 |
| WO | 2018175741 A1 | 9/2018 |

OTHER PUBLICATIONS

Shintake et al., "Soft Robotic Grippers," Wiley Online Library, 1-59 (2018).

Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).

SMC Tech, "Precision Regulator: Series IR1000/2000/3000", SMC Tech, pp. 713-725 and 1-19, 2015 (53 pages).

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

Acome et al., "Hydraulically Amplified Self-Healing Electrostatic Actuators with Muscle-Like Performance," Science, vol. 359, Issue 6371, pp. 61-65 (Jan. 5, 2018) (6 pages).

* cited by examiner

ACTUATOR WITH SEALABLE EDGE REGION

TECHNICAL FIELD

The subject matter described herein generally relates to actuators and, more particularly, actuators with a sealable edge region.

BACKGROUND

Control systems employed for the actuation and positioning of a remote object or the like can include pneumatic, hydraulic and electromechanical systems. These control systems can be used to control the movement of a variety of objects, such as autonomous devices. Each of these types of systems has particular advantages under some conditions. Pneumatic systems can supply force through the delivery of a compressed gas, whereas hydraulic systems rely on minimally compressible liquids.

Furthermore, high pressures can be employed which reduces the size of the operating equipment. Electromechanical systems rely on electrically moveable components and can include combinations of the previous systems (e.g., electro pneumatic and electro hydraulic systems).

SUMMARY

Disclosed herein is an actuator capable of controllably sealing an edge region, as well as methods for the same. In one or more implementations, an actuator is disclosed. The actuator can include a fluid-impermeable membrane configured to deliver a hydraulic force and a compartment defined by the fluid-impermeable membrane. The compartment can include a central region, an edge region extending from and fluidly connected with the central region, a reversible seal between the central region and the edge region, the reversible seal comprising an interlocking element and a connecting element; and a dielectric fluid.

In another implementation, an actuator is disclosed. The actuator can include a fluid-impermeable membrane. The fluid impermeable membrane can include a first insulating portion defining an interior surface of the fluid-impermeable membrane, the first insulating portion comprising an insulating elastomer. The fluid impermeable membrane can further include one or more central conductive portions connected to an outer surface of the first insulating portion, the central conductive portions comprising a conductive material. The fluid impermeable membrane can further include one or more sealing conductive portions connected to an outer surface of the first insulating portion. The sealing conductive portion can include a conductive material. The fluid impermeable membrane can further include a second insulating portion surrounding an exterior surface of the central conductive portions and the sealing conductive portions. The fluid impermeable membrane can further define a compartment. The compartment can further include a central region. The compartment can further include an edge region extending from and fluidly connected with the central region. The compartment can further include a reversible seal between the central region and the edge region, the reversible seal comprising an interlocking element and a connecting element. The compartment can further include a dielectric fluid.

In another embodiment, an actuator is disclosed. The actuator can include a first conductive portion comprising a conductive material and configured to produce an electric field in response to a first electrical input. The actuator can further include a second conductive portion comprising a conductive material, the second conductive portion being positioned opposite the first conductive portion and configured to attract to the first conductive portion in response to the first electrical input. The actuator can further include an insulating portion comprising an elastomer configured to electrically isolate the first conductive portion from the second conductive portion. The actuator can further include a compartment defined within the insulating portion and having a dielectric fluid, the compartment being configured to deliver a hydraulic force to the insulating portion in response to adherence of the first conductive portion and the second conductive portion. The actuator can further include a reversible seal comprising an interlocking element and a connecting element, the reversible seal positioned within the compartment and configured to maintain the hydraulic force on the insulating portion and release the hydraulic force upon receiving a second electrical input.

BRIEF DESCRIPTION OF THE DRAWINGS

So that the manner in which the above recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

The implementations disclosed herein generally relate to an actuator. The implementations described can enable the actuator to maintain an actuated position without further electrical input. The actuator includes a fluid-impermeable membrane defining a compartment which can contain a dielectric fluid. Within the fluid-impermeable membrane is a reversible seal. The actuator can be configured to remain in an activated position, after power to the soft hydraulic actuator is turned off, by sealing the reversible seal. The reversible seal can include one or more interlocking components that can block a fluid passage within the compartment of the fluid-impermeable membrane.

Conductive portions of the actuator can have a deactivated state, such that the electrodes do not compress the fluid-impermeable membrane. Power can be supplied to the electrodes, causing the electrodes to move toward each other, to have an activated state. As a result, the compartment of the fluid-impermeable membrane is compressed, and the dielectric fluid is squeezed to an outer edge region on the membrane, passing the reversible seal to the edge region. When the reversible seal is not activated, the fluid flows through the region freely. The flow of the dielectric fluid into the edge region of the compartment causes the edge region to bulge/stretch to accommodate the dielectric fluid. The reversible seal can then be closed through a secondary actuation or during the initial actuation, creating an interlocking seal which does not allow further fluid flow. Thus, the dielectric fluid is trapped in the edge region of the compartment until the reversible seal is opened to allow reverse flow. The implementations disclosed herein are more clearly described with reference to the figures below.

Figure 1:
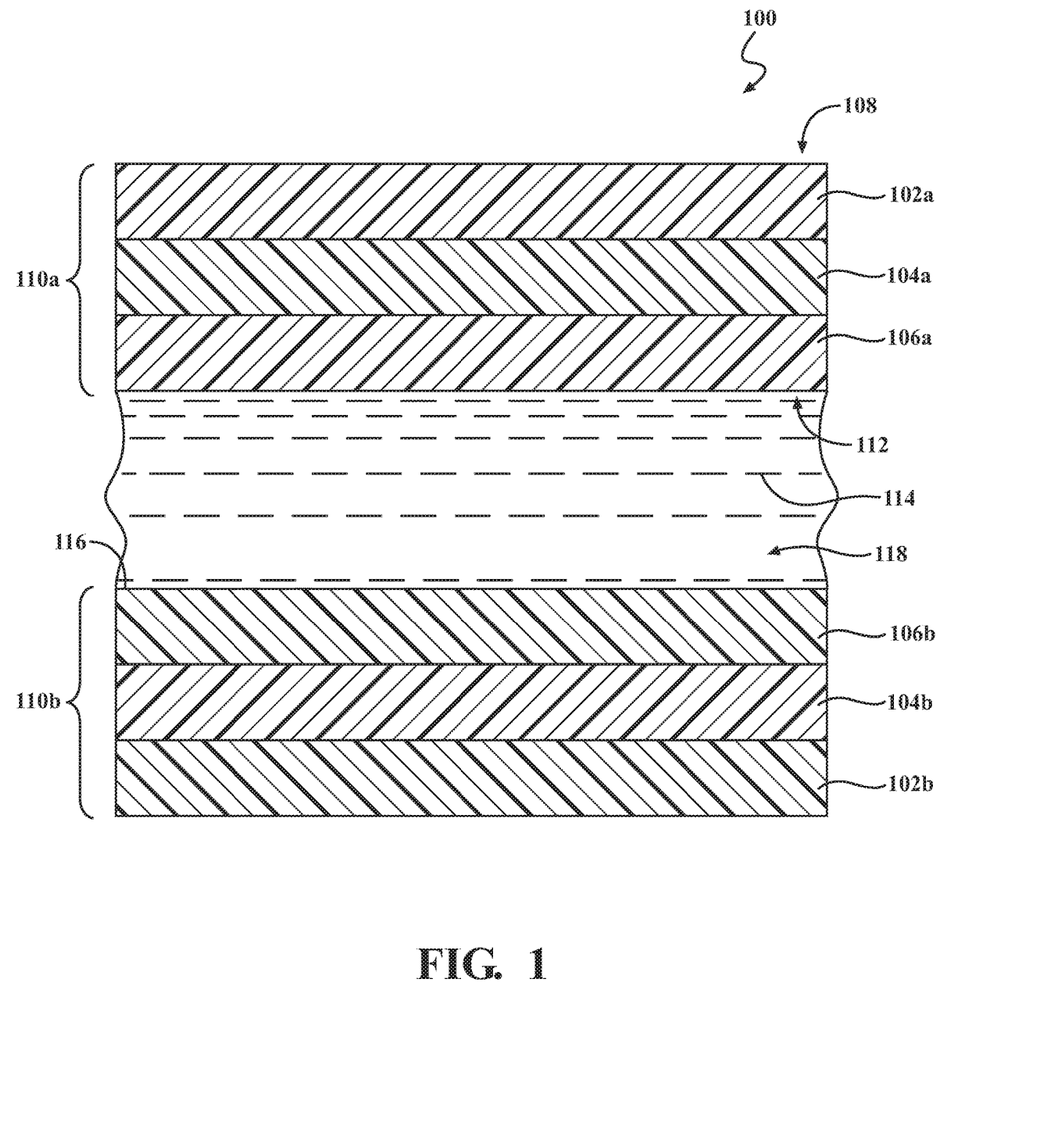
FIG. 1 is a sectional view of components of an actuator, according to one or more implementations.

FIG. 1 are sectional views of an actuator 100, according to one or more implementations. The actuator 100 can be a hydraulic actuator. As will be described herein, the actuator 100 can be configured for connection with a surface and/or for moving one or more objects. The actuator 100 can have a pliable or semi-pliable body, or can otherwise have a soft body. The actuator 100 can be an electrostatic device capable of displacing and/or affecting the flow of a fluid with the application of electric charge. The application of an electric charge can be used to attract two or more conductive elements together into an actuated position. "Actuated position," as used herein, relates to the use electrostatic attraction to bring opposing inner surfaces of the fluid-impermeable membrane toward each other. Thus, hydraulic force can be created. In one or more implementations, the actuated position can be achieved by delivering an electrical input to the conductive portions of the fluid-impermeable membrane, as described herein. "Relaxed position," as used herein, refers to the actuator 100 being in a state without power input from electrostatic attraction creating a hydraulic force in the membrane. In one or more implementations, the relaxed position includes the original shape or the substantially original shape of the membrane, in response to stopping the electrical input to the conductive portions. The actuator 100 can be capable of changing shape in the presence of the electric charge, causing fluid pressure to be applied to the portions of the fluid-impermeable membranes 110a and 110b. This fluid pressure can then change the shape of the actuator 100, in relation to the elasticity of the fluid-impermeable membranes 110a and 110b. Thus, the actuator 100 has a first shape which is maintained in the absence of an electrical input. The electric charge to the actuator 100 can then be delivered, causing the actuator 100 to achieve to a second state, which can include one or more activated shapes, due to hydraulic forces. When the charge is removed, the actuator 100 can then return to substantially the first shape.

As shown here, the actuator 100 can include fluid-impermeable membranes 110a and 110b and a dielectric fluid 114. The fluid-impermeable membranes 110a and 110b can be composed of layers, such as external insulating portions 102a and 102b, conductive portions 104a and 104b, and internal insulating portions 106a and 106b. "Portion," as used herein, relates to one or more components which form a layer, a portion of a layer, or structure in the fluid-impermeable membranes 110a and 110b of the actuator 100. The portions can have non-uniform coverage or thickness, as desired. The portions above are described as a single, uniform element or layer for simplicity purposes. However, the portions can include one or more of any of the layers, portions of layers, or variations as disclosed herein. As such, the portions may only partially extend the dimensions of the fluid-impermeable membranes 110a and 110b. As well, the portions of the fluid-impermeable membranes 110a and 110b can meet to form a seal, such that a chamber or compartment 118 is formed in the inner region of the fluid-impermeable membrane 110a and 110b. It should be noted that internal insulating portions 106a and 106b can be the same structure, or they can be separate structures. Further, external insulating portions 102a and 102b can be separate portions, or they can be the same structure.

The fluid-impermeable membranes 110a and 110b, or components thereof (e.g., the external insulating portions 102a and 102b, the conductive portions 104a and 104b, and/or the internal insulating portions 106a and 106b), can be flexible and/or elastic at one or more points and/or across one or more portions of the fluid-impermeable membranes 110a and 110b. In one or more implementations, the fluid-impermeable membranes 110a and 110b, or components thereof, are completely flexible and elastic. In another implementation, the fluid-impermeable membranes 110a and 110b are flexible across the entirety but only elastic across one or more strips of the fluid-impermeable membranes 110a and 110b. In another implementation, the fluid-impermeable membranes 110a and 110b are flexible and elastic at the external insulating portion 102a and 102b and the internal insulating portions 106a and 106b, but neither flexible nor elastic at the conductive portions 104a and 104b. One skilled in the art will understand the variety of combinations of flexibility, elasticity, and positioning of the portions of the fluid-impermeable membranes 110a and 110b, without further explicit recitation of specific examples herein.

The external insulating portion 102a and 102b can form an exterior surface 108 of the fluid-impermeable membranes 110a and 110b. In one or more implementations, the external insulating portion 102a and 102b can form the entire exterior surface of the fluid-impermeable membranes 110a and 110b. The external insulating portion 102a and 102b can be flexible and/or elastic at one or more portions. In one or more implementations, the external insulating portions 102a and 102b are entirely flexible and elastic. In another implementation, the external insulating portion 102a and 102b can have interspersed regions of flexibility, or flexibility and elasticity. The interspersed regions can be in a pattern or random, as desired. The external insulating portion 102a and 102b can form an interface with the surface of one or more inner layers, such as the internal insulating portions 106a and 106b and/or the conductive portions 104a and 104b.

The external insulating portion 102a and 102b can include a polymer, an elastomeric polymer (elastomer) or both. The use of a plurality of different encapsulating elastomers and/or polymers of varying degrees of softness and hardness can be employed. The polymers used in the implementations described herein can further include the addition of a plasticizer, such as phthalate esters. The polymers or elastomers may be natural or synthetic. Examples of elastomers usable as part of the external insulating portion 102a and 102b can include an insulating elastomer, such as nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, silicone rubber, or combinations thereof. The external insulating portion 102a and 102b can be described with regards to electrical insulation. The electrical insulation of the external insulating portion 102a and 102b can be described in relation to the dielectric constant, or κvalue, of said material, such as having a higher or lower dielectric constant. The term "elastomer," as used herein, means a material which can be stretched by an external force at room temperature to at least twice its original length, and then upon immediate release of the external force, can return to its original length. Room temperature can generally refer to a temperature in a range of from about 20° C. to about 25° C. Elastomers, as used herein, can include a thermoplastic, and may be cross-linked or thermoset.

The conductive portions 104a and 104b can be largely or entirely internal elements of the fluid-impermeable membranes 110a and 110b. The conductive portions 104a and 104b can be conductive to electrical current, such that the conductive portion creates an electric field. In one or more implementations, the conductive portions 104a and 104b can be formed between the external insulating portion 102a and 102b and the internal insulating portions 106a and 106b. In another implementation, the conductive portions 104a and 104b can include hydrogels. The conductive portions 104a and 104b can further include a polymer, an elastomeric polymer (elastomer) or both. Examples of elastomers usable as part of the conductive portions 104a and 104b can include nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. The conductive portions 104a and 104b can be composed or further include a conductive material, such as an electrically conductive dopant. Electrically conductive dopants can include silver, gold, platinum, copper, aluminum, or others. In further implementations, the conductive portions 104a and 104b can include inks and adhesives, for the purpose of flexibility and/or conductivity.

The internal insulating portions 106a and 106b can form an interior surface 112 of the fluid-impermeable membranes 110a and 110b. The internal insulating portions 106a and 106b can be composed of a material similar to that of the external insulating portion 102a and 102b. In one or more implementations, the internal insulating portions 106a and 106b can include an insulating elastomer, such as nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. In one or more implementations, the internal insulating portions 106a and 106b can include polymers and elastomers having a high electric breakdown voltage and not electrically conductive. The internal insulating portions 106a and 106b can further include a protective layer 116. The protective layer 116 can be formed between the internal insulating portions 106a and 106b and a dielectric fluid 114. In some arrangements, the protective layer 116 can form a part of the interior surface 112. The protective layer 116 can be uniform or vary in size or composition. Further, the protective layer 116 can be non-conductive and/or resistant to corrosion. In one or more implementations, the protective layer 116 is a flexible and corrosion resistant plastic, such as fluorinated ethylene propylene (FEP).

Figure 2A:
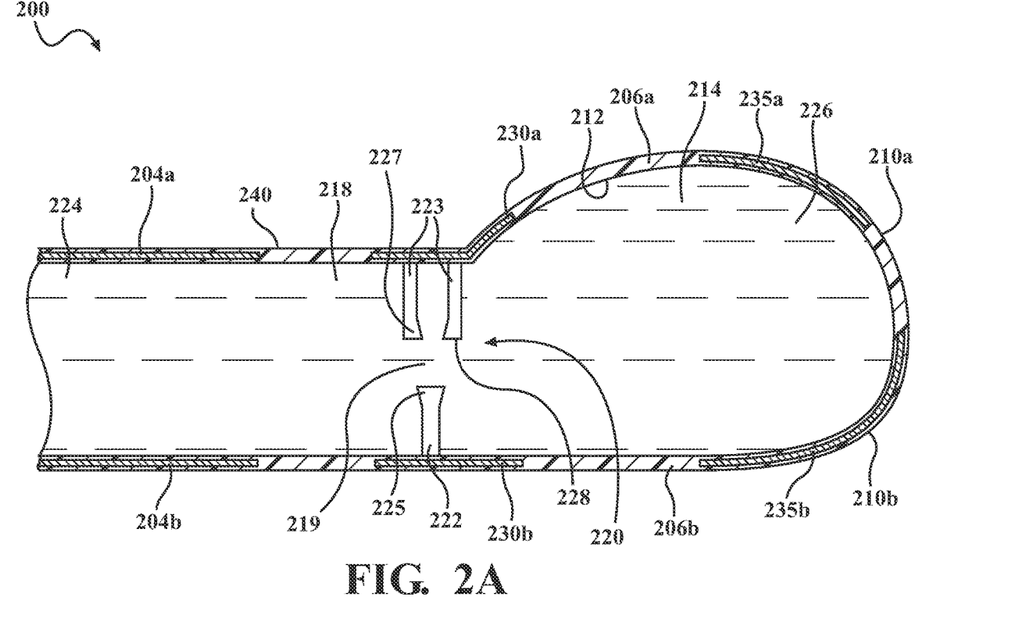
FIGS. 2A and 2B are side sectional views of a portion of an actuator including a reversible seal, according to one or more implementations.
Figure 2B:
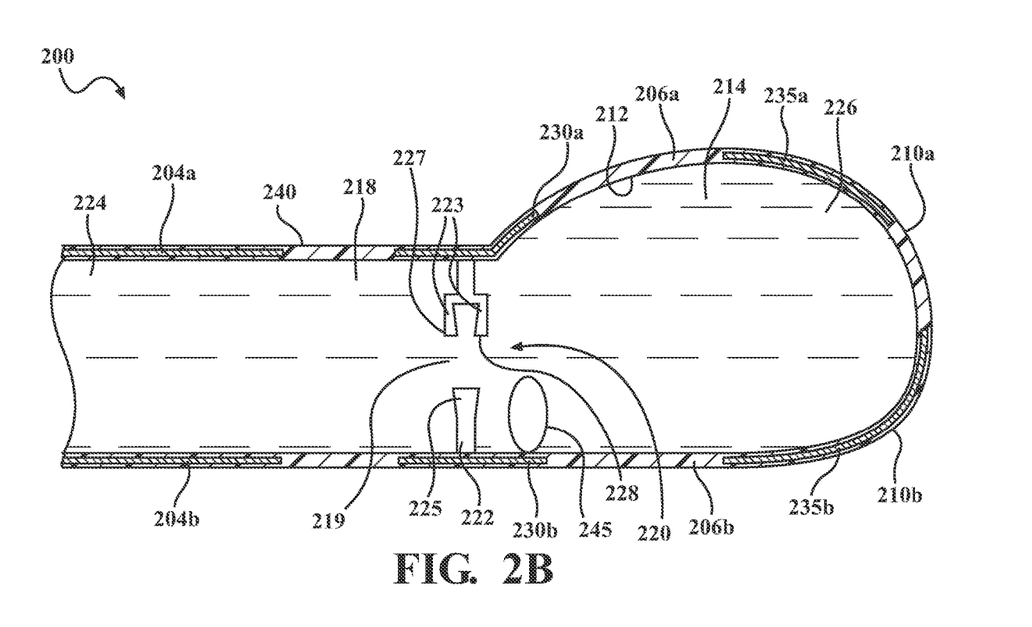

FIGS. 2A and 2B depict side views of a portion of the actuator 200 having a reversible seal 220, according to one or more implementations. The side views depict the actuator 200 as an operating unit, according to one or more implementations. In one or more implementations, the fluid-impermeable membranes 210a and 210b are sealed at the edges and disposed against one another. The actuator 200 and/or components thereof can be substantially similar to the actuator 100, described with reference to FIG. 1. The insulating portions 206a and 206b can form the interior surface 212 of the compartment 218. The dielectric fluid 214 can be disposed inside of the compartment 218.

The fluid-impermeable membranes 210a and 210b can be sealed at one or more edges, such that the fluid-impermeable membranes 210a and 210b can form a fluid-impermeable compartment 218. However, in some implementations, the fluid-impermeable membranes 210a and 210b may not be separate structures, but instead are a unitary structure. The compartment 218 can hold the dielectric fluid 214. The dielectric fluid 214 can be a fluid that is resistant to electrical breakdown and/or provides insulation. In one or more implementations, the dielectric fluid 214 can prevent arcing between one or more opposing layers (e.g., the opposing conductive portions 204a, 204b). The dielectric fluid 214 can be a lipid based fluid, such as a vegetable oil-based dielectric fluid. In one implementation, the dielectric fluid 214 can be ethylene glycol. The dielectric fluid 214 can have a low dielectric constant, or κvalue.

The actuator 200 can include one or more reversible seals 220, which can include an interlocking element 223 and a connecting element 222. The reversible seals 220 are capable of selectively subdividing the compartment 218. The interlocking element 223 can be a component capable of or configured to receive and maintain contact with the connecting element 222. As such, the interlocking element 223 can have a corresponding shape to at least a portion of the connecting element 222, such that the connecting element 222 does not separate from the interlocking element in the absence of a secondary input. The secondary input can be an applied hydraulic force, an electroactive movement (e.g., an electroactive polymer receiving an electrical input), or others. In some implementations, the connecting element 222 can be positioned in alignment with the interlocking element 223 (e.g., forming an opening 219) to form one or more reversible seals 220. An example can include two (2) interlocking elements 223 positioned to interact with the connecting element 222 is shown in FIG. 2A. In further implementations, the connecting element 222 can be positioned in connection with an integrated interlocking element 223 to form one or more reversible seals 220, an example of which is shown in FIG. 2B.

When engaged, the connecting element 222 and the interlocking element 223 of the reversible seals 220 can subdivide the compartment 218 into at least a central region 224 and an edge region 226. The connecting element 222 can be composed of a material substantially similar to one or more materials for the fluid-impermeable membranes 210a and 210b. The central region 224 is a region of the compartment 218 which is in the center of the actuator 200. The central region 224 can include the conductive portions 204a and 204b. The edge region 226 is a region of the compartment 218 which includes the edge of the actuator 200. Further, the edge region 226 can include one or more edge conductive portions 235a and 235b.

The reversible seals 220 can function to control the flow of the dielectric fluid 214 between the central region 224 and the edge region 226. The reversible seals 220 can include the interlocking element 223. The interlocking element 223 can include one or more arms capable of connecting with the connecting element 222 in a grip-like fashion. The interlocking element 223 can include one or more flexible or semi-flexible polymers. In one or more embodiments, the interlocking element 223 can include an electroactive polymer. Materials suitable for use as an electroactive polymer, in the one or more implementations described herein, can include any insulating polymer or rubber (or a combination thereof) that deforms in response to an electrostatic force or whose deformation results in a change in electric field. Exemplary materials suitable for use as an electroactive polymer can include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers, such as those including silicone and acrylic moieties, can include copolymers having silicone and acrylic moieties, polymer blends having a silicone elastomer and an acrylic elastomer, or others. Combinations of some of these materials may also be used as the interlocking element 223 and/or the connecting element 222 in the reversible seals 220 disclosed herein.

Materials used as an electroactive polymer for the interlocking element 223 can be selected based on one or more material properties. Material properties used for selection can include a high electrical breakdown strength, a low modulus of elasticity (such as for controlling the level of deformation), or others. The interlocking element 223 used herein can include a wide range of thicknesses to suit the fluid control requirements of the present implementations. The thickness of the interlocking element 223 in the reversible seal 220 can be reduced by stretching an existing polymer film in one or both planar directions, can be fabricated and implemented as thin films, or others.

In one or more implementations, the one or more electrodes 240 can positioned near, positioned on or integrated with one or more components of the actuator 200. One or more electrodes 240 can be connected with the interlocking element 223 of the reversible seal 220. The electrodes 240 can be flexible or malleable, such as being capable of deforming or deflecting without compromising mechanical or electrical performance. Generally, electrodes 240 as used herein can be of a shape and material such that they can supply a suitable voltage to or receive a suitable voltage from the reversible seal 220. The voltage delivered through the electrodes 240 be either constant or varying over time. In one or more implementations, the electrodes 240 can adhere to a surface of the interlocking element 223 and/or the connecting element 222. Electrodes 240, which can adhere to a component of the reversible seal 220, can be compliant and conform to the changing shape of the reversible seal 220. In further implementations, the electrodes 240 can be formed in the connecting element 222 and/or the interlocking element 223 of the reversible seal 220. Correspondingly, one or more implementations can include compliant electrodes that conform to the shape of the reversible seal 220 which they are attached to or positioned within. The electrodes 240 can be applied to a portion of the interlocking element 223 of the reversible seal 220 and define an active area according to their geometry.

The reversible seal 220 is depicted here as a unit, including a cut-away portion of a connecting element 222 and an interlocking element 223. The connecting element 222 and/or the interlocking element 223 can be a continuous element, such as following the circumference of a circle or moving from adjoining wall to adjoining wall. As such, the connecting element 222 can be used in conjunction with the interlocking element 223 to form a continuous reversible seal 220. The interlocking element 223 can further be associated with one or more electrodes 240. When the connecting element 222 and the interlocking element 223 are not engaged, an opening 219 can be defined between them. The opening 219 can be configured to allow the dielectric fluid 214 to move between the central region 224 and an edge region 226 when the reversible seal 220 is open.

In one or more implementations, the interlocking element 223 can include material properties such that the interlocking element 223 can connect with the connecting element 222 to control the opening 219. The material properties can include shape and dimensions, material composition, and others. The material composition can include one or more material types and/or combinations of materials. In one implementation, the interlocking element 223 can include polymers and electroactive polymers, each as described above.

The interlocking element 223 can have a variety of dimensions and form one or more shapes or combinations of shapes. Possible shapes for the interlocking element 223 can include all primary shapes or combinations thereof, such that the interlocking element 223 is capable of closing the opening 219 in conjunction with the connecting element 222. In this example, the interlocking element 223 is a square-shaped with a slightly expanded head configured for interconnection with the equivalent region of the connecting element 222. In further implementations, the interlocking element 223 can include components that are triangular, circular, hexagonal, or others.

In operation, the interlocking element 223 can regulate and/or control fluidic communication between the central region 224 and the edge region 226. The interlocking element 223 can be connected to the connecting element 222 by sealing conductive portions 230a, 230b. The sealing conductive portions 230a, 230b can receive an electric input which causes the sealing conductive portions 230a, 230b to attract. The force caused by the attraction of the sealing conductive portions 230a, 230b moves a head region 225 of the connecting element 222 into connection with a receiving region 227 of the interlocking element 223. Thus, the physical force locks the interlocking element 223 and the connecting element 222 together (e.g., a locked state). The connecting edge 228 of the interlocking element 223 can be separated from the connecting element 222 (e.g., the unlocked state) or connected to the connecting element 222 (e.g., the locked state). In embodiments which employ an electroactive polymer, the interlocking element 223 can change state to separate from the connecting element 222. When the interlocking element 223 is in a passive unlocked state (e.g., an unlocked state while not receiving an electric current), the reversible seal 220 can allow the flow of the dielectric fluid 214 through the opening 219 and between the central region 224 and the edge region 226. However, the locked state of the interlocking element 223 can limit or prevent the return flow of the dielectric fluid 214 into the central region 224.

When the interlocking element 223 is in an active state (e.g., receiving an electric current), the interlocking element 223 can move to a second position which no longer maintains a connection with the connecting element 222. If previously in a locked state, thus blocking fluid flow, the second position of the interlocking element 223 can release the connecting element 222 and allow a return flow of the dielectric fluid 214. In one example, when the interlocking element 223 receives an electric charge, such as from the electrode 240, the flexing edge 228 can move out and away from the connecting element 222. This movement of the interlocking element 223 can allow the dielectric fluid 214 to flow through the opening 219. In embodiments which employ other polymers, the interlocking element 223 can be physically separated from the connecting element 222 by the creation of a fluid force in the edge region 226. The edge conductive portions 235a, 235b can receive an electric charge, thus creating a hydraulic force in the edge region 226. This hydraulic force can apply pressure on the portion of the membrane connected to the connecting element 222 and the interlocking element 223, thus causing the elements to physically separate.

In further embodiments, the connecting element 222 and the interlocking element 223 can be physically separated by an optional electroactive bead 245. The electroactive bead 245 can be configured to lift or expand in response to an electric input. As the electroactive bead 245 lifts or expands, the connecting element 222 and the interlocking element 223 can be moved apart which opens the seal. As such, the dielectric fluid 214 can equilibrate between the central region 224 and the edge region 226. The properties of movement for the interlocking element 223 can be controlled as desired, including the range and direction of movement, the force of movement, and other facets of the change in position, in accordance with implementations described herein.

Thus, the reversible seal 220 can control the flow of fluids from either the edge region 226 or the central region 224 with minimal energy input. When in a passive state, the reversible seal can allow for free flow of fluid between the edge region 226 and the central region 224. When in an active state, the reversible seal can allow free flow of fluid between the edge region 226 and the central region 224. Thus, the actuator 200 can be actuated and held in an actuated position without further input from the conductive portion 204a and 204b.

FIGS. 3A-3E are depictions of a series of movements from an example of an actuator 300, according to one or more implementations. The actuator 300 can be a soft hydraulic actuator, as described above with reference to FIG. 1. The actuator 300 can include a fluid-impermeable membrane 302, including an insulating portion 303 with one or more central conductive portions 304a, one or more sealing conductive portions 304b, and one or more edge conductive portions 304c disposed therein. The fluid-impermeable membrane 302 can define a compartment 306. The compartment 306 can hold a dielectric fluid 308.

Further, the compartment 306 can be subdivided into a central region 310 and an edge region 312 by a reversible seal 314. The reversible seal 314 can include a connecting element 316, an interlocking element 318, and an opening 319. The fluid-impermeable membrane 302 can be connected with an electrode 320 and/or a control unit 322, such as for delivering an electrical input to one or more responsive components as described herein. The actuator 300 and/or components thereof can be substantially similar to the actuator 100, described with reference to FIG. 1. The reversible seal 314 can be substantially similar to the reversible seal 220, described with reference to FIGS. 2A and 2B.

The actuator 300 can be configured to lock the actuator 300 in an active state. The actuator 300 can have central conductive portions 304a comprising a conductive material. The central conductive portions 304a can be configured to produce an electric field in response to a first electrical input. The actuator 300 can further have sealing conductive portions 304b comprising a conductive material. The sealing conductive portions 304b can be positioned opposite each other, and the central conductive portions 304a can be positioned opposite each other. The sealing conductive portions 304b can be configured to attract to each other, and the central conductive portions 304a can be configured to attract to each other, in response to the first electrical input. The actuator 300 can further include the insulating portion 303 as part of the fluid-impermeable membrane 302. The insulating portion 303 can be configured to electrically isolate the central conductive portions 304a from the sealing conductive portions 304b. The actuator 300 can include the compartment 306, as defined by the insulating portion 303. The compartment 306 can include the dielectric fluid 308 and can be configured to deliver a hydraulic force of the dielectric fluid 308 to at least the insulating portion 303 in response to activation and/or adherence of the central conductive portions 304a and the sealing conductive portions 304b. The actuator 300 can further include a reversible seal 314 positioned within the compartment 306. The reversible seal 314 can be configured to maintain the hydraulic force on the insulating portion 303. The reversible seal 314 can further be configured to release the hydraulic force upon receiving an unlocking hydraulic force, such as from the electrode 320 and/or the control unit 322 at the one or more edge conductive portions 304c.

Figure 3A:
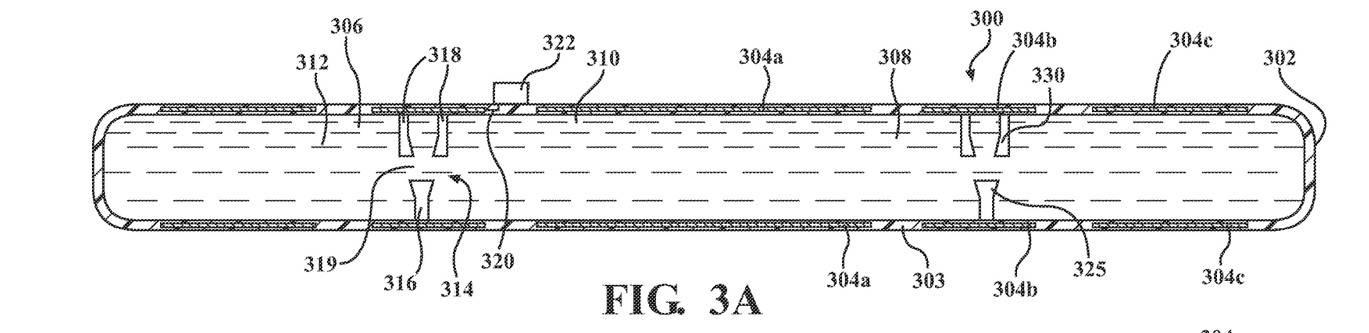
FIGS. 3A-3E are depictions of a series of movements from an implementation of soft hydraulic actuators having a reversible seal, according to one or more implementations.

FIG. 3A depicts the actuator 300 in a relaxed unlocked state. The dielectric fluid 308 can be substantially evenly dispersed across the central region 310 and the edge region 312. The central conductive portions 304a, the sealing conductive portions 304b, and the edge conductive portions 304c can be in a passive state, not receiving an electric input. As such, the hydraulic force delivered by dielectric fluid 308 in conjunction with the fluid-impermeable membrane 302 can be equal throughout the actuator 300. As well, the interlocking element 318 of the reversible seal 314 can be separated from the connecting element 316, allowing flow through the opening 319. As shown here, the interlocking element 318 can allow flow through the opening 319, between the central region 310 and the edge region 312.

Figure 3B:
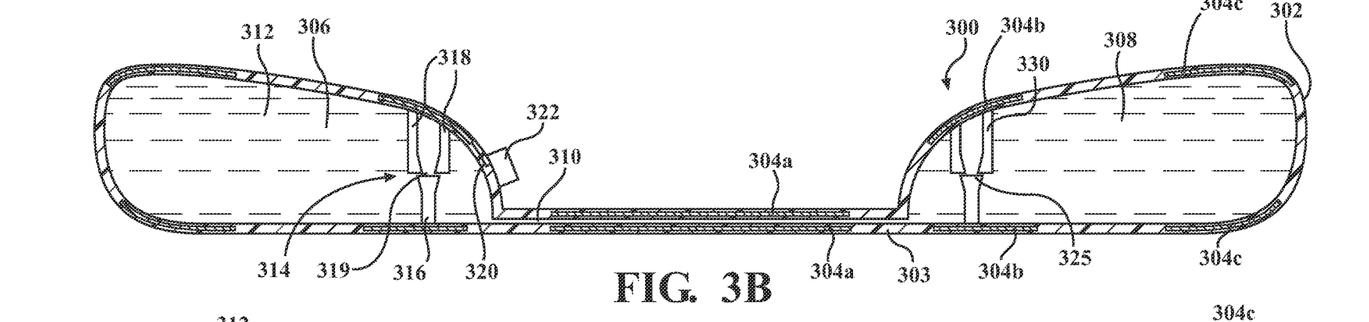

FIG. 3B depicts the actuator 300 with the central conductive portions 304a in an active state. Here, the central conductive portions 304a can receive an electric input, which transitions the central conductive portions 304a from the passive state to an active state. The dielectric fluid 308 can be forced by the contraction in the central region 310 into the edge region 312 through the opening 319. As such, the hydraulic force delivered by dielectric fluid 308 in conjunction with the fluid-impermeable membrane 302 of the central region 310 can expand the fluid-impermeable membrane 302 in the edge region 312. During this time, the interlocking element 318 of the reversible seal 314 can be in a passive state, allowing flow from the central region 310 into the edge region 312.

When the central conductive portions 304a are in the active state, fluid pressure from the dielectric fluid is higher in the central region 310 than the edge region 312. The interlocking element 318 and the connecting element 316 of the reversible seal 314 allows the flow of the dielectric fluid 308 through the opening 319 from the central region 310 into the edge region 312. The hydraulic force can continue until the pressure from the edge region 312 is equal to the pressure from the central region 310, or until the dielectric fluid has moved entirely over into the edge region 312. The fluid-impermeable membrane 302 in the edge region 312 can be expanded in relation to the elasticity of the fluid-impermeable membrane 302.

Figure 3C:
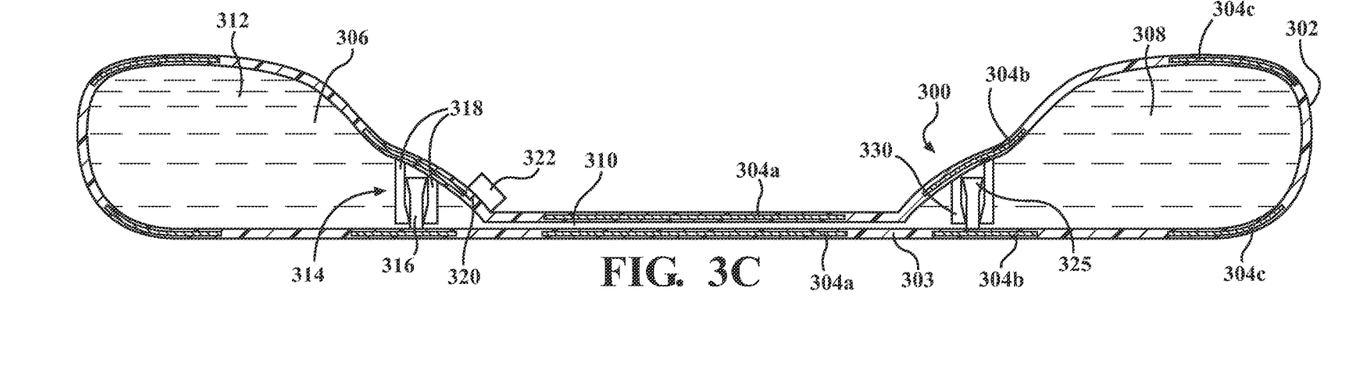

FIG. 3C depicts the actuator 300 in a locked active state. Here, the electric input has been further applied to sealing conductive portions 304b, which forces a head region 325 of connecting element 316 and a receiving region 330 of the interlocking element 318 together. Thus, the reversible seal 314 is in a locked state. The dielectric fluid 308, being previously forced by the contraction of the central conductive portion 304a in the central region 310 into the edge region 312 through the opening 319, is maintained by the locked state of the reversible seal 314. The hydraulic force delivered by dielectric fluid 308 in conjunction with the fluid-impermeable membrane 302 of the central region 310 can be held in place by the reversible seal 314. Thus, the reversible seal 314 maintains the expansion of the fluid-impermeable membrane 302 in the edge region 312.

In the locked active state, the interlocking element 318 of the reversible seal 314 is forced into the connecting element 316, which blocks return flow through the opening 319 from the edge region 312 into central region 310. As the reversible seal 314 is not permeable, the hydraulic force applies an equal force to the fluid-impermeable membrane 302 and the reversible seal 314. The hydraulic force is insufficient to separate the reversible seal 314 thus creating the opening 319. As such, a hydraulic force is delivered to the edge region 312 and sealed by the locked active state of the reversible seal 314.

Figure 3D:
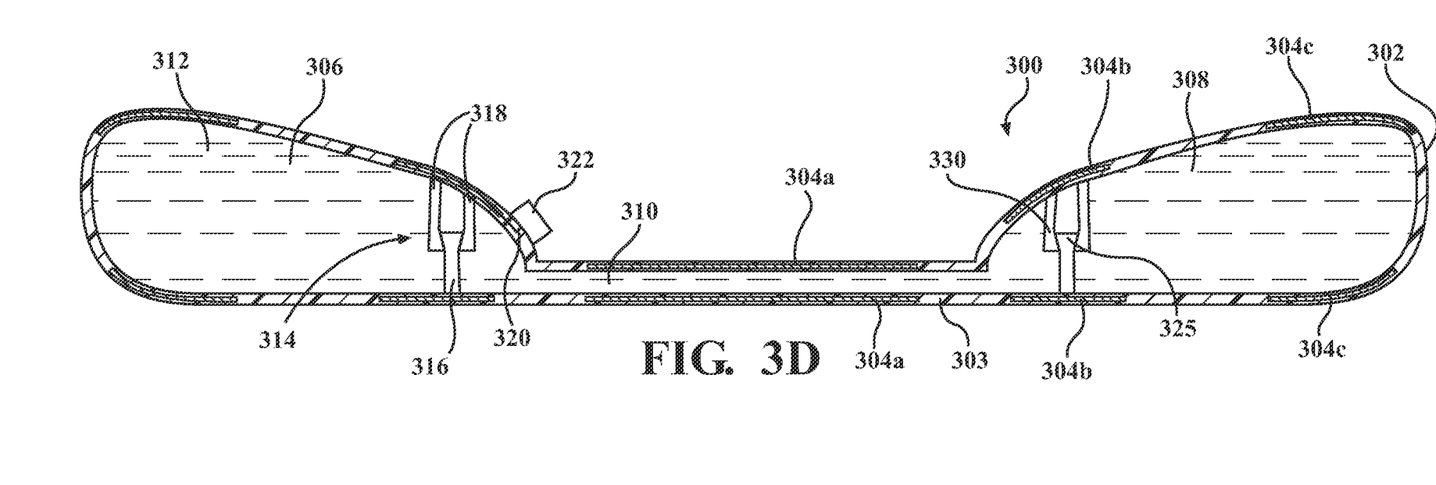

FIG. 3D depicts the actuator 300 in a locked passive state. Here, the electric input has been removed from the central conductive portions 304a and the sealing conductive portions 304b, which allows the conductive portions 304 to move into the passive state from the active state. The dielectric fluid 308, being previously forced by the contraction in the central region 310 into the edge region 312 through the opening 319, is maintained by the reversible seal 314. The hydraulic force delivered by dielectric fluid 308 in conjunction with the fluid-impermeable membrane 302 of the central region 310 can be held in place by the reversible seal 314. Thus, the interlocking element 318 maintains the expansion of the fluid-impermeable membrane 302 in the edge region 312.

In the locked passive state, the receiving region 330 of the interlocking element 318 is maintained in connection with the head region 325 of connecting element 316 by the interlocking size and shape of the respective components. Thus the reversible seal 314 continues to block return flow through the opening 319 from the edge region 312 into central region 310. The interlocking element 318 is shown here as two (2) strips, each attached at a first end to the fluid-impermeable membrane 302. As the interlocking element 318 is not permeable and the receiving region 330 is in contact with the head region 325, the hydraulic force applies an equal force to the fluid-impermeable membrane 302 and the interlocking element 318. The hydraulic force thus compresses the interlocking element 318 against the connecting element 316 to block the opening 319. As such, a hydraulic force is delivered to the edge region 312 and maintained indefinitely by the interlocking element 318 in the absence of electrical input.

Figure 3E:
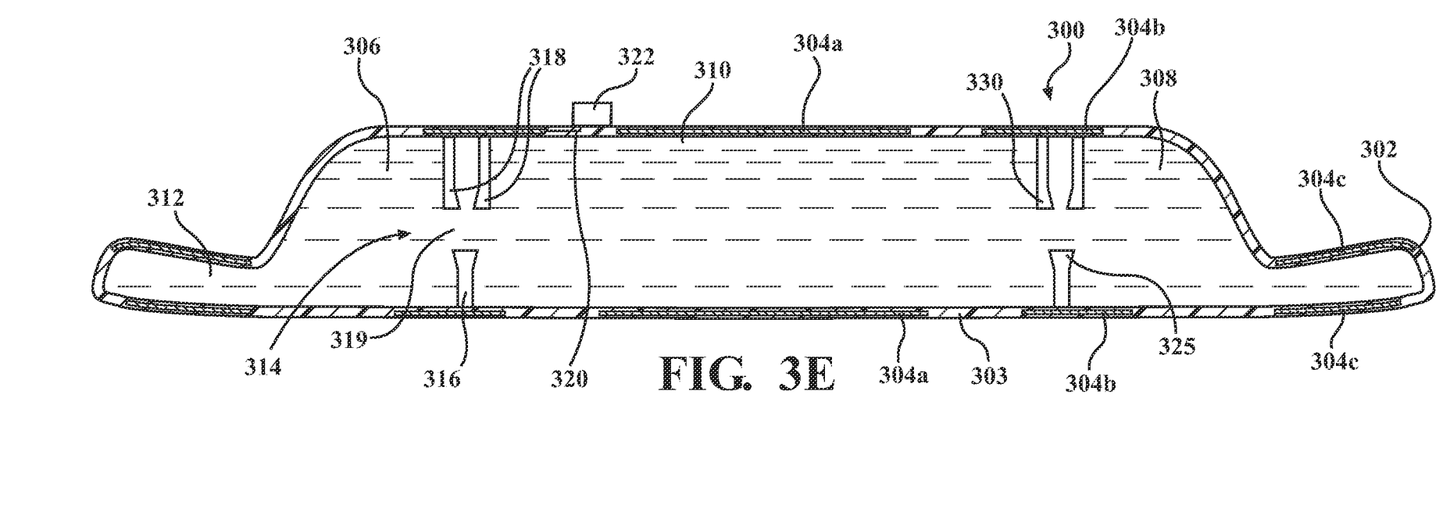

FIG. 3E depicts the actuator 300 in an unlocked active state. Here, the electric input has been removed from the central conductive portions 304a and the sealing conductive portions 304b, which as described above places those conductive portions into the passive state. The dielectric fluid 308, being previously forced by the contraction in the central region 310 into the edge region 312 through the opening 319, is released by actuating the edge conductive portions 304c. The edge conductive portions 304c can receive an electric input from the electrode 320 and/or the control unit 322 to create a physical movement in the edge region 312. Thus, the hydraulic force delivered by dielectric fluid 308 in conjunction with the fluid-impermeable membrane 302 of the edge region 312 can be used to release the connecting element 316 from the interlocking element 318. Once released, the dielectric fluid 308 once again equilibrates between the central region 310 and the edge region 312.

In the active state, the interlocking element 318 of the reversible seal 314 is forced away from the connecting element 316, once again opening fluid communication between the edge region 312 and the central region 310. The interlocking element 318 can be separated from the connecting element 316 by the increase in hydraulic force from the actuation of the edge conductive portions 304c. The edge conductive portions 304c can respond to the electric input by closing together, as previosuly described with reference to FIG. 1. The hydraulic force thus breaks the seal between the connecting element 316 and the interlocking element 318, allowing the dielectric fluid 308 to return to other regions of the actuator 300.

The actuator 300 described herein can provide numerous benefits. By locking in an activated state, the actuator 300 can deliver force through hydraulic pressure without further energy input. Thus, lift moving or otherwise displacing an object can be done in a more energy efficient fashion and over a longer period of time. Further, the actuator 300 can deliver hydraulic force in stages, such as when using more than one pair of conductive portions for actuation.

FIGS. 4A-4E are depictions of a series of movements from an example of an actuator 400, according to one or more implementations. The actuator 400 can be a soft hydraulic actuator, as described above with reference to FIG. 1. The actuator 400 can include a fluid-impermeable membrane 402, including an insulating portion 403. The insulating portion 403 can include one or more central conductive portions 404a and one or more sealing conductive portions 404b disposed therein. The fluid-impermeable membrane 402 can define a compartment 406. The compartment 406 can hold a dielectric fluid 408.

Further, the compartment 406 can be subdivided into a central region 410 and an edge region 412 by a reversible seal 414. The reversible seal 414 can include a connecting element 416, an interlocking element 418, and an opening 419. The interlocking element 418, shown here as a single element, can be connected with an electrode 420 and/or a control unit 422. The actuator 400 and/or components thereof can be substantially similar to the soft hydraulic actuator 100, described with reference to FIG. 1. The reversible seal 414 and/or components thereof can be substantially similar to the reversible seals 220 described with reference to FIGS. 2A and 2B.

Figure 4A:
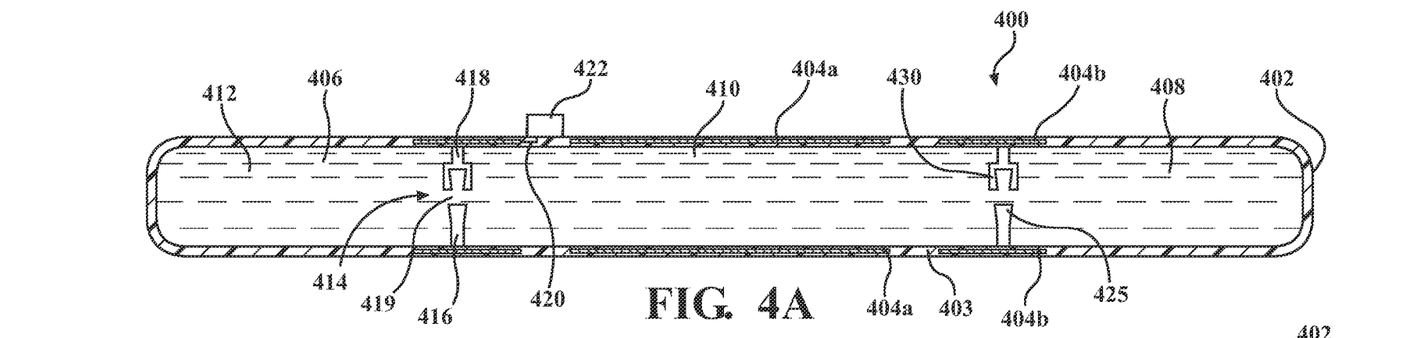
FIGS. 4A-4E are depictions of a series of movements from an alternative implementation of soft hydraulic actuators having a reversible seal, according to one or more implementations.

FIG. 4A depicts the actuator 400 in a relaxed unlocked state. The dielectric fluid 408 can be substantially evenly dispersed across the central region 410 and the edge region 412. The central conductive portions 404a and the sealing conductive portions 404b can be in a passive state, not receiving an electric input. As such, the hydraulic force delivered by dielectric fluid 408 in conjunction with the fluid-impermeable membrane 402 can be equal throughout the actuator 400. As well, the interlocking element 418 of the reversible seal 414 can be separated from the connecting element 416, allowing flow through the opening 419. As shown here, the interlocking element 418 can allow flow through the opening 419, between the central region 410 and the edge region 412.

Figure 4B:
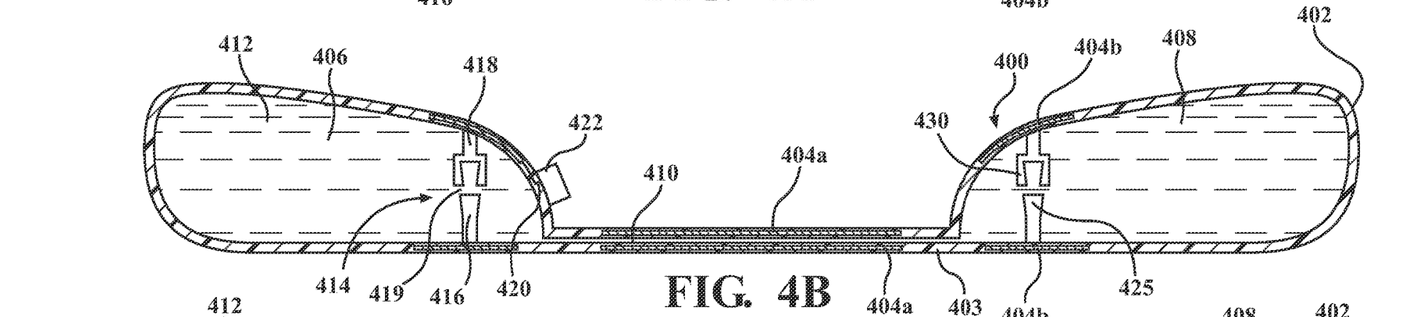

FIG. 4B depicts the actuator 400 with the central conductive portions 404a in an active state. Here, the central conductive portions 404a can receive an electric input, which transitions the central conductive portions 404a from the passive state to an active state. The dielectric fluid 408 can be forced by the contraction in the central region 410 into the edge region 412 through the opening 419. As such, the hydraulic force delivered by dielectric fluid 408 in conjunction with the fluid-impermeable membrane 402 of the central region 410 can expand the fluid-impermeable membrane 402 in the edge region 412. During this time, the interlocking element 418 of the reversible seal 414 can be in a passive unlocked state, allowing flow from the central region 410 into the edge region 412.

When the central conductive portions 404a are in the active state, fluid pressure from the dielectric fluid is higher in the central region 410 than the edge region 412. The interlocking element 418 and the connecting element 416 of the reversible seal 414 allows the flow of the dielectric fluid 408 through the opening 419 from the central region 410 into the edge region 412. The hydraulic force can continue until the pressure from the edge region 412 is equal to the pressure from the central region 410, or until the dielectric fluid has moved entirely over into the edge region 412. The fluid-impermeable membrane 402 in the edge region 412 can be expanded in relation to the elasticity of the fluid-impermeable membrane 402.

Figure 4C:
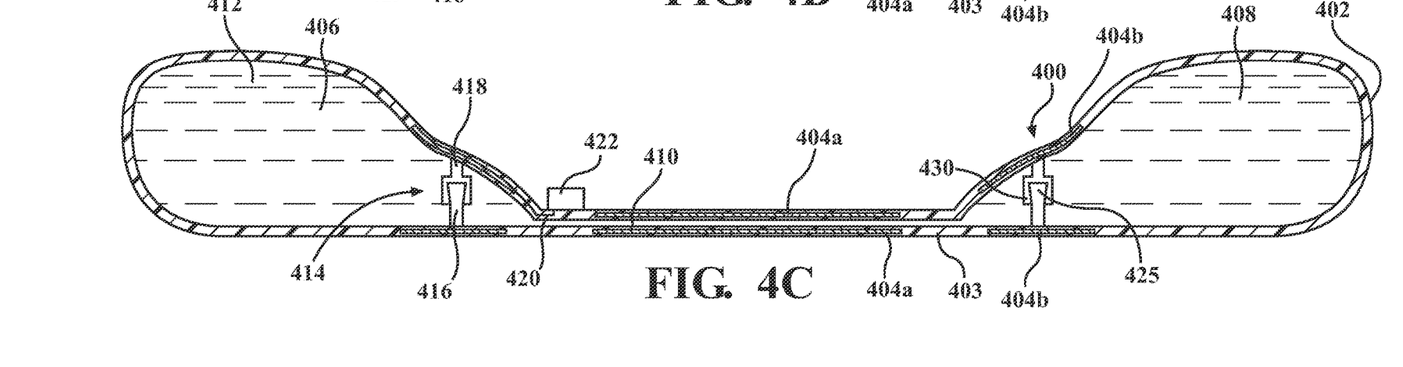

FIG. 4C depicts the actuator 400 in a locked active state. Here, the electric input has been further applied to sealing conductive portions 404b, which forces a head region 425 of connecting element 416 and a receiving region 430 of the interlocking element 418 together. Thus, the reversible seal 414 is in a locked state. The dielectric fluid 408, being previously forced by the contraction of the central conductive portions 404a in the central region 410 into the edge region 412 through the opening 419, is maintained by the locked state of the reversible seal 414. The hydraulic force delivered by dielectric fluid 408 in conjunction with the fluid-impermeable membrane 402 of the central region 410 can be held in place by the reversible seal 414. Thus, the reversible seal 414 maintains the expansion of the fluid-impermeable membrane 402 in the edge region 412.

In the locked active state, the interlocking element 418 of the reversible seal 414 is forced into the connecting element 416 by the sealing conductive portions 404b. This connection blocks flow through the opening 419 from the edge region 412 into central region 410. As the reversible seal 414 is not permeable, the hydraulic force applies an equal force to the fluid-impermeable membrane 402 and the reversible seal 414. The hydraulic force is insufficient to separate the reversible seal 414 thus creating the opening 419. As such, a hydraulic force is delivered to the edge region 412 and maintained by the sealing conductive portions 404b against the reversible seal 414.

Figure 4D:
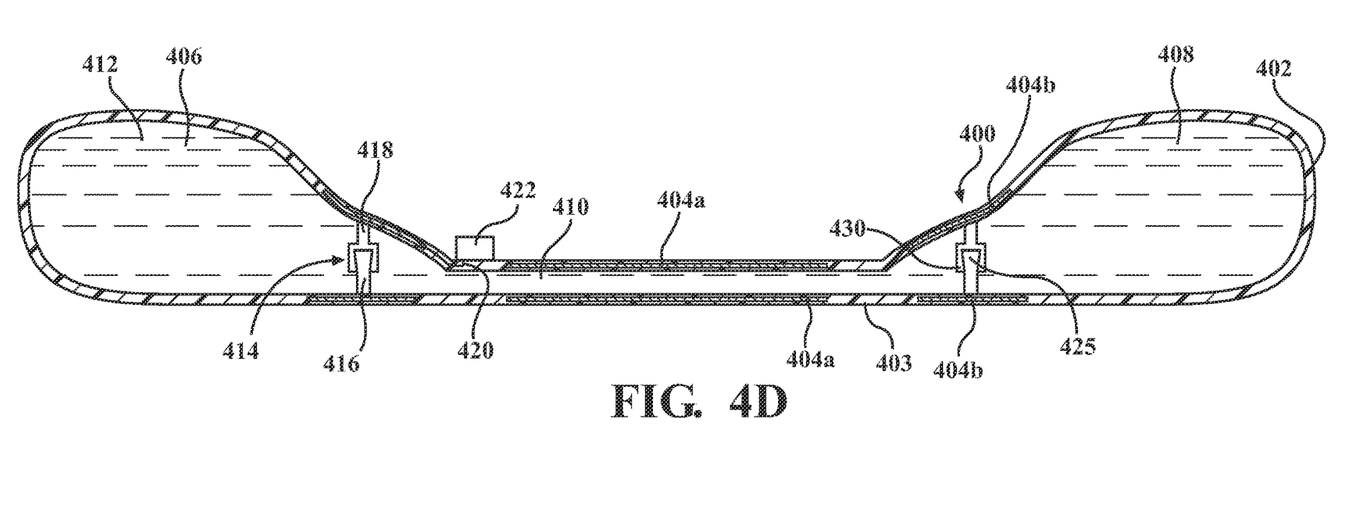

FIG. 4D depicts the actuator 400 in a locked passive state. Here, the electric input has been removed from the central conductive portions 404a and the sealing conductive portions 404b, which allows the conductive portions 404a, 404b to move into the passive state from the active state. The dielectric fluid 408, being previously forced by the contraction in the central region 410 into the edge region 412 through the opening 419, is maintained by the reversible seal 414. The hydraulic force delivered by dielectric fluid 408 in conjunction with the fluid-impermeable membrane 402 of the central region 410 can be held in place by the reversible seal 414. Thus, the interlocking element 418 maintains the expansion of the fluid-impermeable membrane 402 in the edge region 412.

In the locked passive state, the receiving region 430 of the interlocking element 418 of the reversible seal 414 is maintained in connection with the head region 425 of connecting element 416 by the interlocking size and shape of the respective components. Thus the reversible seal 414 continues to block return flow through the opening 419 from the edge region 412 into central region 410. The interlocking element 418 is shown here as a strip attached at a first end to the connecting element 416 and comprising an electroactive polymer. As the interlocking element 418 is not permeable, the hydraulic force applies an equal force to the fluid-impermeable membrane 402 and the interlocking element 418. The hydraulic force thus compresses the interlocking element 418 against the opening 419 creating a seal. As such, a hydraulic force is delivered to the edge region 412 and maintained indefinitely by the interlocking element 418.

Figure 4E:
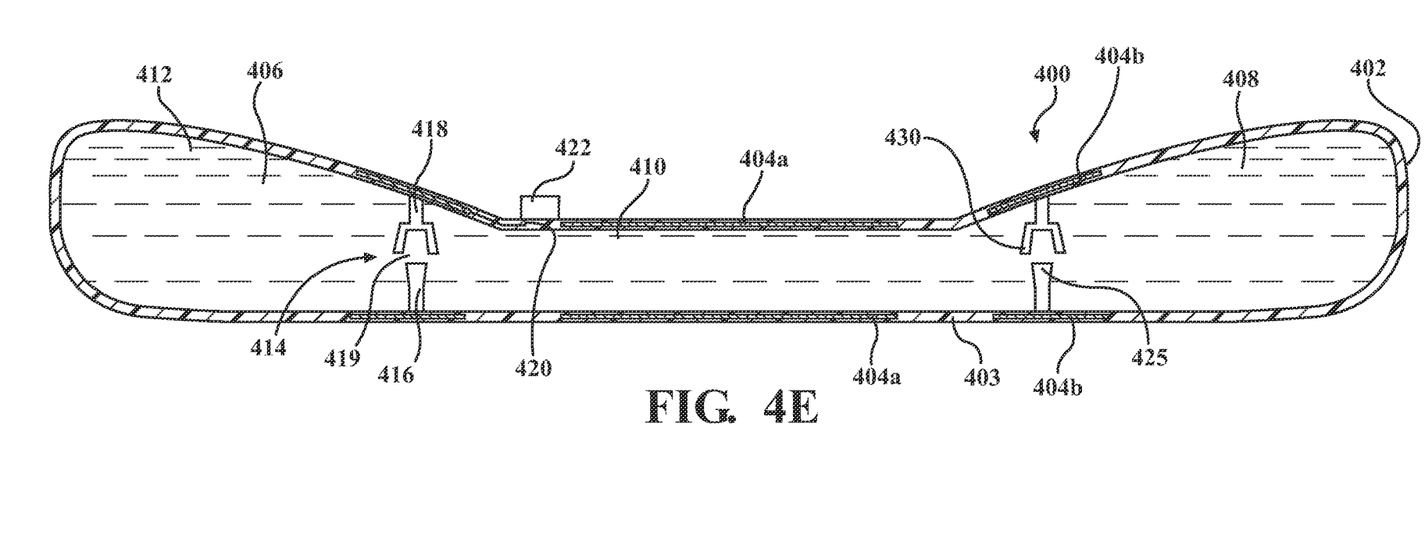

FIG. 4E depicts the actuator 400 in an unlocked active state. Here, the electric input has been removed from the central conductive portions 404a and the sealing conductive portions 404b, which, as described above, places the central conductive portions 404a and the sealing conductive portions 404b into the passive state. The dielectric fluid 408, being previously forced by the contraction in the central region 410 into the edge region 412 through the opening 419, is released by actuating the interlocking element 418. The interlocking element 418 can receive an electric input from the electrode 420 and/or the control unit 422 to create a physical movement in the interlocking element 418. The hydraulic force delivered by dielectric fluid 408 in conjunction with the fluid-impermeable membrane 402 of the edge region 412 can be released by the interlocking element 418. Thus, the dielectric fluid 408 once again equilibrates between the central region 410 and the edge region 412.

In the active state, the interlocking element 418 of the reversible seal 414 lifts away from the connecting element 416, forming the opening 419 between the edge region 412 and the central region 410. The interlocking element 418 comprising an electroactive polymer can move away from or otherwise separate from the connecting element 416. The interlocking element 418 can respond to the electric input in a number of ways, including lifting away from, contracting/expanding, shifting upward, or otherwise separating from the connecting element 416. Though shown as separating from the connecting element 416 bilaterally, the interlocking element 418 can act in a non-uniform fashion. The interlocking element 418 thus breaks the seal with the connecting element 416 to form the opening 419, thus allowing the dielectric fluid 408 to return to other regions of the actuator 400.

Thus, the actuator 400 can be configured to lock the actuator 400 in an active state. The actuator 400 can have a first conductive portion (e.g., the central conductive portion 404a or the sealing conductive portions 404b on the lower side of FIGS. 4A-4E) comprising a conductive material. The first conductive portion can be configured to produce an electric field in response to a first electrical input. The actuator 400 can further have a second conductive portion (e.g., the central conductive portion 404a or the sealing conductive portion 404b on the upper side of FIGS. 4A-4E) comprising a conductive material. The second conductive portion can be positioned opposite the first conductive portion. The second conductive portion can be configured to attract to the first conductive portion in response to the first electrical input. The actuator 400 can further include the insulating portion 403 as part of the fluid-impermeable membrane 402. The insulating portion 403 can be configured to electrically isolate the first conductive portion from the second conductive portion. The actuator 400 can include the compartment 406, as defined by the insulating portion 403. The compartment 406 can include the dielectric fluid 408 and can be configured to deliver a hydraulic force of the dielectric fluid 408 to at least the insulating portion 403 in response to activation and/or adherence of the first conductive portion and the second conductive portion. The actuator 400 can further include a reversible seal 414 positioned within the compartment 406. The reversible seal 414 can be configured to maintain the hydraulic force on the insulating portion 403. The reversible seal 414 can further be configured to release the hydraulic force upon receiving a second electrical input, such as from the electrode 420 and/or the control unit 422 at the interlocking element 418. In further embodiments, the electroactive polymer can be in the connecting element 416 and/or the interlocking element 418. Thus, an electric input can create a conformational shift in the connecting element 416 and/or the interlocking element 418 to cause the above described separation.

The actuator 400 described herein can provide numerous benefits. By locking in an activated state, the actuator 400 can deliver force through hydraulic pressure without further energy input. Thus, lift moving or otherwise displacing an object can be done in a more energy efficient fashion and over a longer period of time. Further, the actuator 400 can deliver hydraulic force in stages, such as when using more than one pair of conductive portions for actuation.

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-4E, but the implementations are not limited to the illustrated structure or application.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the implementation of the methods described herein and, which when loaded in a processing system, can carry out these methods.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure.

Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. An actuator comprising:
a fluid-impermeable membrane configured to deliver a hydraulic force; and
a compartment defined by the fluid-impermeable membrane, the compartment having:
a central region;
an edge region extending from and fluidly connected with the central region;
a reversible seal between the central region and the edge region, the reversible seal comprising an interlocking element and a connecting element; and
a dielectric fluid.

2. The actuator of claim 1, wherein the fluid-impermeable membrane comprises:
a first insulating portion;
one or more pairs of central conductive portions connected to an outer surface of the first insulating portion and affecting the central region; and
one or more pairs of sealing conductive portions connected to an outer surface of the first insulating portion and configured to compress the interlocking element and the connecting element; and
a second insulating portion defining an exterior surface of the fluid-impermeable membrane.

3. The actuator of claim 2, wherein the first insulating portion contains one or more polymers, and wherein the one or more polymers are configured to control direction of elasticity.

4. The actuator of claim 2, wherein the fluid-impermeable membrane comprises a plurality of pairs of central conductive portions, and wherein the plurality of pairs of central conductive portions are positioned evacuate the central region upon receiving an electrical input.

5. The actuator of claim 2, further comprising an edge conductive portion positioned in the edge region.

6. The actuator of claim 1, wherein the reversible seal comprises an electroactive polymer.

7. The actuator of claim 6, wherein the reversible seal includes a plurality of independently controllable subsections.

8. The actuator of claim 1, wherein the interlocking element has a receiving portion configured to receive a head portion of the connecting element.

9. An actuator comprising:
a fluid-impermeable membrane, comprising:
a first insulating portion defining an interior surface of the fluid-impermeable membrane, the first insulating portion comprising an insulating elastomer;
one or more central conductive portions connected to an outer surface of the first insulating portion, the central conductive portions comprising a conductive material; and
one or more sealing conductive portions connected to an outer surface of the first insulating portion, the sealing conductive portion comprising a conductive material; and
a second insulating portion surrounding an exterior surface of the central conductive portions and the sealing conductive portions; and
a compartment defined by the fluid-impermeable membrane, the compartment having:
a central region;
an edge region extending from and fluidly connected with the central region;
a reversible seal between the central region and the edge region, the reversible seal comprising an interlocking element and a connecting element; and
a dielectric fluid.

10. The actuator of claim 9, wherein the first insulating portion contains one or more polymers, and wherein the one or more polymers are configured to control direction of elasticity.

11. The actuator of claim 9, wherein the fluid-impermeable membrane comprises a plurality of pairs of central conductive portions, and wherein the plurality of pairs of central conductive portions are positioned evacuate the central region upon receiving an electrical input.

12. The actuator of claim 9, further comprising an edge conductive portion positioned in the edge region.

13. The actuator of claim 9, wherein the reversible seal comprises an electroactive polymer.

14. The actuator of claim 13, wherein the reversible seal includes a plurality of independently controllable subsections.

15. The actuator of claim 9, wherein the interlocking element has a receiving portion configured to receive a head portion of the connecting element.

16. An actuator comprising:
a first conductive portion comprising a conductive material and configured to produce an electric field in response to a first electrical input;
a second conductive portion comprising a conductive material, the second conductive portion being positioned opposite the first conductive portion and configured to attract to the first conductive portion in response to the first electrical input;
an insulating portion comprising an elastomer configured to electrically isolate the first conductive portion from the second conductive portion;
a compartment defined within the insulating portion and having a dielectric fluid, the compartment being configured to deliver a hydraulic force to the insulating portion in response to adherence of the first conductive portion and the second conductive portion; and
a reversible seal comprising an interlocking element and a connecting element, the reversible seal positioned within the compartment and configured to maintain the hydraulic force on the insulating portion and release the hydraulic force upon receiving a second electrical input.

17. The actuator of claim 16, wherein the insulating portion contains one or more polymers, and wherein the one or more polymers are configured to control direction of elasticity.

18. The actuator of claim 16, wherein the compartment comprises a central region and an edge region, wherein an edge conductive portion is positioned in the edge region.

19. The actuator of claim 16, wherein the interlocking element has a receiving portion configured to receive a head portion of the connecting element.

20. The actuator of claim 16, wherein one or more sealing conductive elements are positioned in connection with the interlocking element and the connecting element.

\* \* \* \* \*